United States Patent
Murez

Patent Number: 5,579,407
Date of Patent: Nov. 26, 1996

[54] OPTICAL CHARACTER CLASSIFICATION

[76] Inventor: James D. Murez, 804 Main St., Venice, Calif. 90291

[21] Appl. No.: 116,221

[22] Filed: Sep. 2, 1993

Related U.S. Application Data

[63] Continuation of Ser. No. 871,939, Apr. 21, 1992, abandoned.

[51] Int. Cl.⁶ ............................................. G06K 9/46
[52] U.S. Cl. .......................... 382/164; 382/175; 358/453; 358/538
[58] Field of Search ........................ 382/61, 17, 48, 382/9, 163, 164, 173, 317, 173, 165, 176, 175, 306, 305; 358/453, 538; 395/145, 148, 149

[56] References Cited

U.S. PATENT DOCUMENTS

| | | | |
|---|---|---|---|
| 3,938,088 | 2/1976 | Clark | 340/146.3 B |
| 4,479,242 | 10/1984 | Kurata | 382/17 |
| 4,538,182 | 8/1985 | Saito et al. | 382/61 |
| 4,553,261 | 11/1985 | Froessl | 382/57 |
| 4,574,393 | 3/1986 | Blackwell et al. | 382/17 |
| 4,577,235 | 3/1986 | Kannapell et al. | 382/52 |
| 4,601,057 | 7/1986 | Tsuji et al. | 382/51 |
| 4,724,309 | 2/1988 | Greene | 235/468 |
| 4,760,606 | 7/1988 | Lesnick et al. | 382/6 |
| 4,812,904 | 3/1989 | Maring et al. | 358/107 |
| 4,985,863 | 1/1991 | Fujisawa et al. | 382/40 |
| 5,010,580 | 4/1991 | Vincent et al. | 382/17 |
| 5,014,328 | 5/1991 | Rudak | 382/17 |
| 5,016,096 | 5/1991 | Matsunawa et al. | 358/453 |
| 5,048,099 | 9/1991 | Lee | 382/61 |
| 5,048,109 | 9/1991 | Bloomberg et al. | 382/9 |
| 5,138,465 | 8/1992 | Ng et al. | 358/462 |

FOREIGN PATENT DOCUMENTS

| | | | |
|---|---|---|---|
| 2047821 | 3/1992 | Canada | G06K 7/10 |
| 3225477 | 10/1991 | Japan . | |
| 4130978 | 1/1992 | Japan | 382/17 |

OTHER PUBLICATIONS

Shibanishi et al. "Optical Character Reader Corresponding to Color" JP 04–130978 Translation.
Tag Image File Format Specification Revision 5.0 by Aldus Corporation, 1987 and 1988.
Resumix brochure by Resumix Inc.

Primary Examiner—Michael T. Razavi
Assistant Examiner—Jon Chang
Attorney, Agent, or Firm—Curtis L. Harrington

[57] ABSTRACT

An optical character recognition system which can extract information from documents into machine readable form for selected inclusion into a data base uses human classification through the use of translucent ink pens of colors which correlate to field designations. The ink pens, commonly known as highlighters, are used to mark the selected text. An optical scanner reads the marked document and converts it to electronic data which is stored into data base fields according to the color marked regions.

8 Claims, 5 Drawing Sheets

OPTICAL CHARACTER CLASSIFICATION

This is a continuation of application Ser. No. 07/871,939 filed on Apr. 21, 1992 now abandoned.

BACKGROUND

This invention generally relates to the automatic detection and selection of color classified typed or hand written pages of printed text into data base fields of machine readable form through the use of an electronic scanner with an optical character recognition (OCR) routine.

Optical character recognition computer routines are well known and have been for some time used for extracting typed or hand written text from pre-printed forms as well as from free form text documents. Of these two types of documents, only the first has been used for automatically extracting text for inclusion into data base files where the information is content classified into data base fields.

References on optical character recognition abound, and include Vincent et al. U.S. Pat. No. 5,010,580, issued on Apr. 23, 1991; Peter Rudak U.S. Pat. No. 5,014,328, issued on May 7, 1991; Harold E. Clark U.S. Pat. No. 3,938,088, issued on Feb. 10, 1976; Masami Kurata U.S. Pat. No. 4,479,242, issued on Oct. 23, 1984; Lesnick et al U.S. Pat. 4,760,606, issued on Jul. 26, 1988; and Maring et al U.S. Pat. No. 4,812,904, issued on Mar. 14, 1989.

There are presently two basic technologies for extracting data into data base files using the optical character recognition routines. Both technologies include the use of an electronic scanner, a host computer system, optical character recognition software and some form of human intervention for the purpose of classifying the data for the appropriate data base field. Of the two methods, the one which is most commonly used for high volume processing is the pre-printed forms.

Figure 1A:
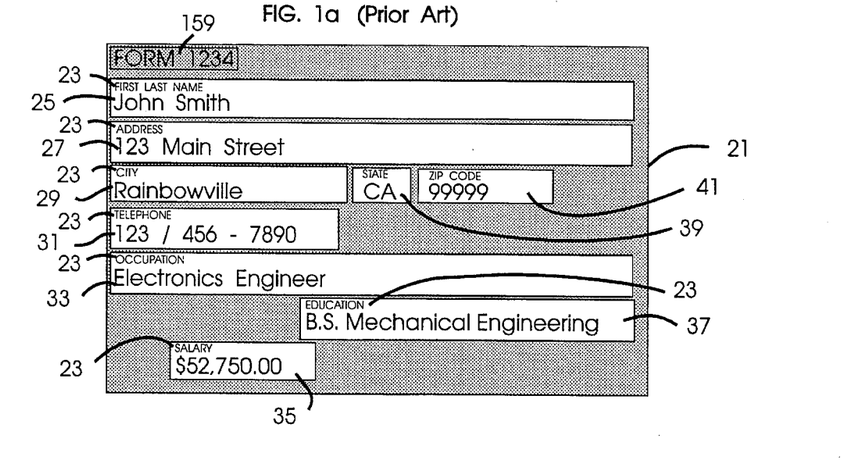
FIG. 1a illustrates a prior art method for defining typewritten text fields for extraction using optical character recognition and conversion into data base fields.
Figure 1B:
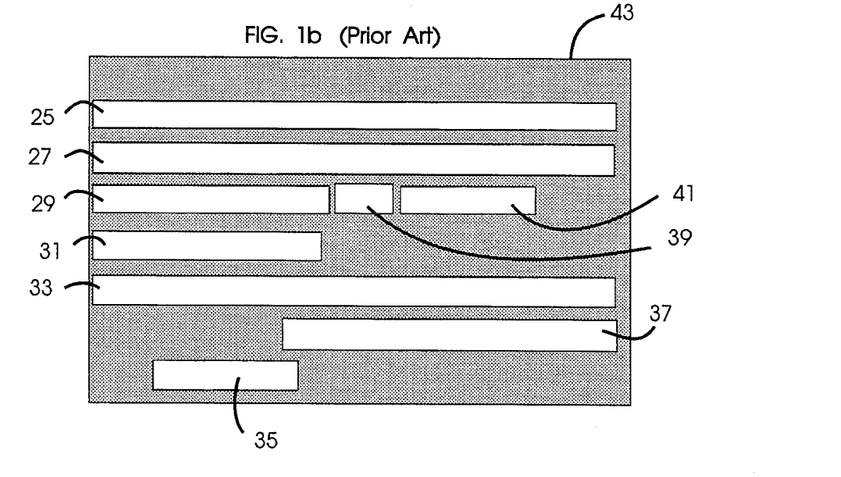
FIG. 1b illustrates a template utilized in extracting data from the fields of text shown in FIG. 1.

Referring to FIGS. 1a and 1b, a pre-printed form 21 is shown, having pre-printed headings 23 existing within well defined regions 25, 27, 29, 31, 33, 35, 37, 39, and 41 corresponding to the data entry field name, address, city, telephone No., occupation, salary, education, zip code and state, respectively. These fields are filled in with sample information shown in FIG. 1a to illustrate the blocked field regions as they would be actually scanned. FIG. 1b is an illustration of a template 43 and is devoid of information to more clearly identify the regions 25–41. In FIG. 1a, one or more areas of the form 21 may exist for identifying the form type, or other designations.

The regions 25–41 are typically boxed to identify to the human filling out the form the areas in which the data belonging within the regions 25–41 will be written. In setting up the process initially, a forms extraction portion of the optical character recognition software is configured to scan and convert characters only which exist within the regions 25–41. The forms extraction software allows the user to build a template 43 which has a screen appearance similar to that shown in FIG. 1b.

The advantages of this system are its simplicity, speed and high degree of accuracy. This system is somewhat desirable when large amounts of data forms are to be converted. Typical users might include the Internal Revenue Service for use on tax forms, medical offices and hospitals with patient records, or insurance companies with claim forms. The disadvantage of this system, is that the data must be located in the regions 25–41 which relates to a classification mask or template 43 represented in FIG. 1b that is programmed to correspond to a data base file.

Figure 2:
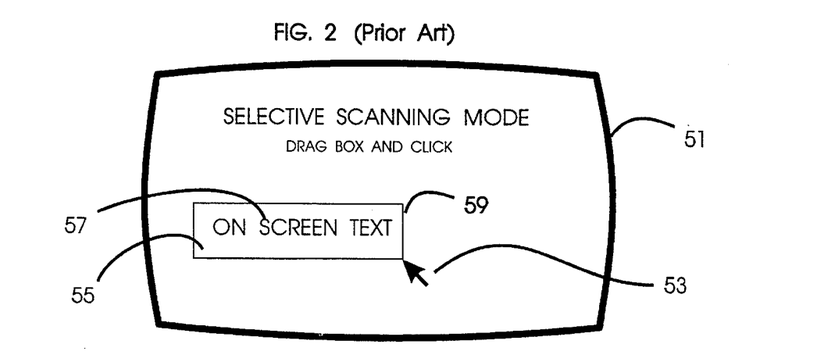
FIG. 2 shows a computer screen configured to illustrate an alternative method for defining typewritten text fields for extraction using optical character recognition and conversion into data base fields.

An alternate system, currently available from several companies, uses the same basic concept of creating what is essentially a template to classify the target data and is illustrated in FIG. 2. A typical computer screen 51 with a mouse cursor pointer 53 enables an operator to select a region or target zone 55 containing text 57 to be optical character recognition converted into ASCII text for inclusion into a data base.

Typically, the operator selects the region by dragging a box 59 around the desired text image. Once all of the regions on the form are defined, the combined group of regions can be saved as a template for use at a later time. A good example of this method is a pre-printed mailing list or a telephone book where the label format or page layout is constant.

The most significant difference from the system described above is that the data does not come from pre-printed forms. In this system, as long as the data is located in the same region from page to page, a template can be created which works similarly to the above described system.

The problems with both of the above described systems include the requirement that the text to be optically character recognized resides in a defined area of the text to be scanned. If there is a variance in a batch of forms received from a printer, or if the forms are copied causing spatial distortion, whole batches of data will be unreadable. In the alternative, a new template must be formed for each set of forms which are at variance with the originally formed template.

The above described system cannot handle free format information. If forms are not available, and there is not sufficient time to make new forms, the collector of the data must either wait until the next available opportunity to gather the data, or collect the data in an unformatted configuration for subsequent copying into a formatted configuration by a clerk, a task requiring non-optimum utilization of labor hours.

Further, in cases where data is received from several sources, in an unformatted form, the above two systems are useless in attempting to scan in the information, especially without recopying onto a form. The use of a scanning system to eliminate the human step of transcribing data alphabetical letter by alphabetical letter in the instance of an unformatted data source is most desirable.

In addition to the above described systems which extract data from forms, artificial intelligence systems are being used for extracting information from free form text documents. One of these systems, is advertised and described by Resumix Corporation and is a part of their product line. Their literature describes the use of a knowledge base to select key words in a scanned text as the objects which are used to categorize a particular portion of data into a data field to be categorized into a data base.

There are several disadvantages to this type of system, such as the slow speed and consequently longer time it takes to process a document, the cost of the system, setup time required to adequately create and fully characterize a custom knowledge base to recognize pertinent key words for a particular application. In most applications utilizing this system, significant human intervention is required in reading the document to decide what action needs to be taken. This task is usually performed on a computer screen.

A major disadvantage of this system is the potential for mischaracterization of the extent of the data to be included within the field. For example, when a key word is recognized, the device must make some arbitrary decision regarding whether or not all of the data surrounding the key word is included in the field. It may include too much information or too little information. Such mischaracterization requires additional significant human intervention in checking the character recognized data.

BRIEF SUMMARY OF THE INVENTION

The optical character recognition system of the present invention can extract unformatted typed or hand written text from documents into machine readable form for inclusion into a data base. The unformatted information is categorized by its content into fields with only slight human intervention. The text is classified through the use of translucent ink pens having colors which correlate to field designations. The ink pens, commonly known as highlighters, are used to mark the selected text. An optical scanner reads the marked document, recognizes the color of the highlighted text, associates the color of the highlighted text with a field, and reads the data within the highlighted field into electronic data which is placed into its associated data base field. The data within the highlighted area is therefore classified according to its color marked regions.

BRIEF DESCRIPTION OF THE DRAWINGS

The invention, its configuration, construction, and operation will be best further described in the following detailed description, taken in conjunction with the accompanying drawings in which.

DETAILED DESCRIPTION

The device and method of the present invention, in contrast to the prior art systems, does not require text to be located in a particular region. Further, this invention is well suited for applications where the original document is in a free form format and where there are few, if any, identically laid out pages. This type of document is typically seen in human resource departments by recruiters who receive job applicant resumes or in accounting departments by clerks who receive invoices from several vendors.

The common factor in such cases is that the recipient of the document has little or no control over how the text will be laid out on a page. As a result, this invention can be applied to these cases and save countless hours of manually keying in of data, a process which is often prone to typing errors.

Figure 3:
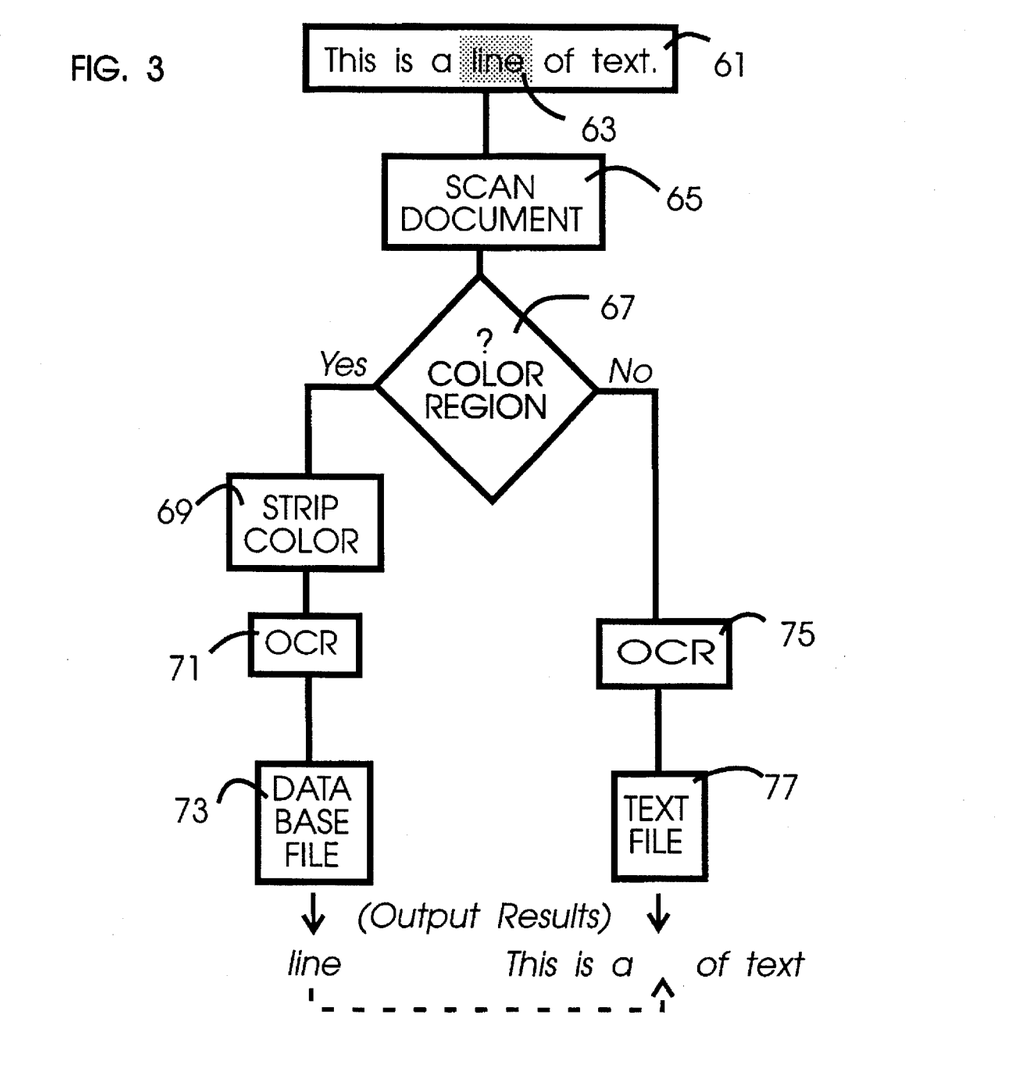
FIG. 3 is a simplified logic flowchart illustrating the device and system of the present invention.

FIG. 3 illustrates a logic flow chart for a system for classifying data, based on color, from scanned documents. A line 61 of text on paper or other scanable material shows a region 63 which is shaded with a translucent ink. In the text reading "This is a line of text", the word "line" is shaded with a translucent ink. The region 63 was marked with a highlighting pen which is readily available from most art supply or office stationery stores.

Once a document is marked, it is scanned as shown in the scan document block 65. The scanning process should include the capability of recognizing either grayscale or color. A command is issued from a host computer system to a scanner (not shown in FIG. 3), telling it to read the document. This command may be a command of a type which is described by the Scanner Control Language developed by Hewlett Packard, for example. The image read is converted from an analog signal having varying voltage levels based on the varying intensities of the image into a digital representation. These varying intensities are a function of the color with which the image is highlighted. The analog signal is then digitized, and the digital characterizations associated with the image is then transferred via an I/O port into the host computer's memory.

Regarding the details of the scanning process, the incoming digital data from a scanning process has a resolution which is commonly described in pixels per inch. Each pixel represents one dot and typically has color or shades of gray associated with it. As the document is scanned, it outputs a stream of pixels equal with the width of the scan, which is referred to as one scan line. The data for the example described here is read one line at a time from left to right, horizontally and is usually the primary scanning direction. Each line has associated with it a vertical line coordinate as the page is vertically scanned. The vertical direction is usually the secondary scanning direction. The lines continue to be read until the bottom of the page is reached, concluding the scanning process and leaving a digital representation of the document image in the host computer's memory.

In most presently available scanners, the digital intensity of each pixel in the image occupies 4 or 8 bits of computer memory for grayscale images, and more than 24 bits for color. This data, which has a decimal value from 0 to 15 or from 0 to 255 for grayscale images and even more for color images, identifies the optical density or colors of the original document. The values which fall between the minimum and the maximum decimal values are grayscale or color representations of the intensity light from the image surface.

The data which is scanned into memory is transformed into a file format with information which describes how it was generated. For instance, the resolution, bits per pixel, pixels per scan line, size of image in memory and so on are added as tags to a header along with the binary data which was scanned to create one inclusive file. For ease of illustration, the TIFF (Tag Image File Format) file format is used, although several other industry standards exist.

Once in tag image file format, the data is interrogated to determine the image margin boundaries, line spacing, and the minimum and maximum optical densities. These quantities must be determined before the image can be converted into ASCII (American Standard Code for Information Interchange) format by use of an optical character recognition routine.

In the device and process of the present invention, and after the document is scanned, as represented by scan document block 65, the background color of the image is established at color region decision diamond 67. The background color is the region of area that surrounds or is immediately adjacent to the text which was typed or hand written onto the document which was scanned. The scanned document is typically white paper.

Again referring to FIG. 3, as the TIFF data in memory is processed for classification, a "yes" branch from the color region decision diamond 67 is followed to a strip color block 69. In strip color block 69 the color region 63 is identified, and the data for label classification is computationally separated. In FIG. 3, the sample text 61 has a colored region 63 which is diverted to the strip color block 69 which includes a routine which labels the color by density and then reassigns the minimum density value to any pixels which have a value below the upper limit 47 value for the midrange grayscale. The diverted data, which now has only black and white values, (values at 4% and 95% reflectivity respectively), can be further processed by any commonly available optical character recognition routine. This step is necessary if the optical character recognizer requires adequate contrast in order to properly recognize information. Some optical character recognizers may not require such contrast.

The logic in the process proceeds to the optical character recognition OCR block 71 where the optical character recognition takes place and an ASCII code for each character recognized is assigned. As the optical character recognition process is completed, the logic flows to a data base file block 73 as the ASCII data output generated in the optical character recognition step is stored in a data base file associated with the appropriate field based on the prior color label. The contents of the data base file, for the example of FIG. 3, is simply the word "line".

An OCR block 75 is connected to the "no" output of decision diamond 67. The "no" path enables optical character recognition to take place on non-colored areas, and without the necessity for the stripping of color step which occurred in strip color block 69. The ASCII data output generated in the optical character recognition step in OCR block 75 is stored in a text file represented by text file block 77. The text file block 77 was created from the sample text 61 using optical character recognition without any special considerations to color which would have occurred in color strip block 69. The contents of the text file, for the example of FIG. 3, is the phrase "This is a of text".

Figure 4:
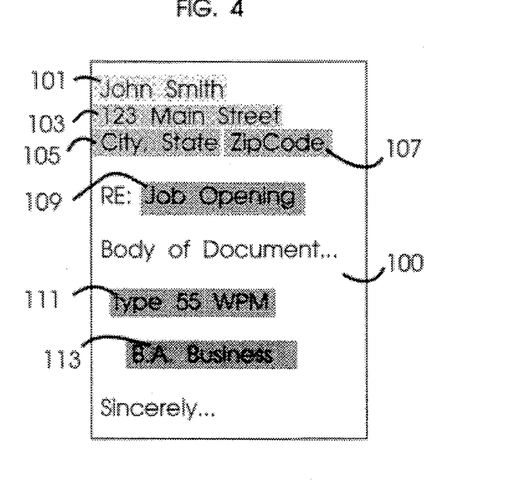
FIG. 4 exemplifies a typewritten document with shaded text regions.

Note that the output of OCR block 71 may be made available to text file block 77 to create a complete text file. In such a case, the complete text file may be stored as an auxiliary file, or the text may be stored with the word "line" tagged with a data base identifier. The line between the word "line" and the blank space in the phrase "This is a of text" illustrates this option A second example of the process is illustrated in more detail beginning with FIG. 4. FIG. 4 is an example of a letter 100 which has been color coded with highlighter or other ink over different portions of its surface. For example, the portions of the letter of FIG. 4 which are highlighted include the "John Smith" name 101, the "123 Main Street" address 103, the "City, State" portion of the address 105, the zip code portion of the address 107, the "job opening" topic portion of the letter 109, and two fields of interest within the body of the document 111 and 113. Each of the portions 101–113 are given a different color coding.

Figures 5, 6:
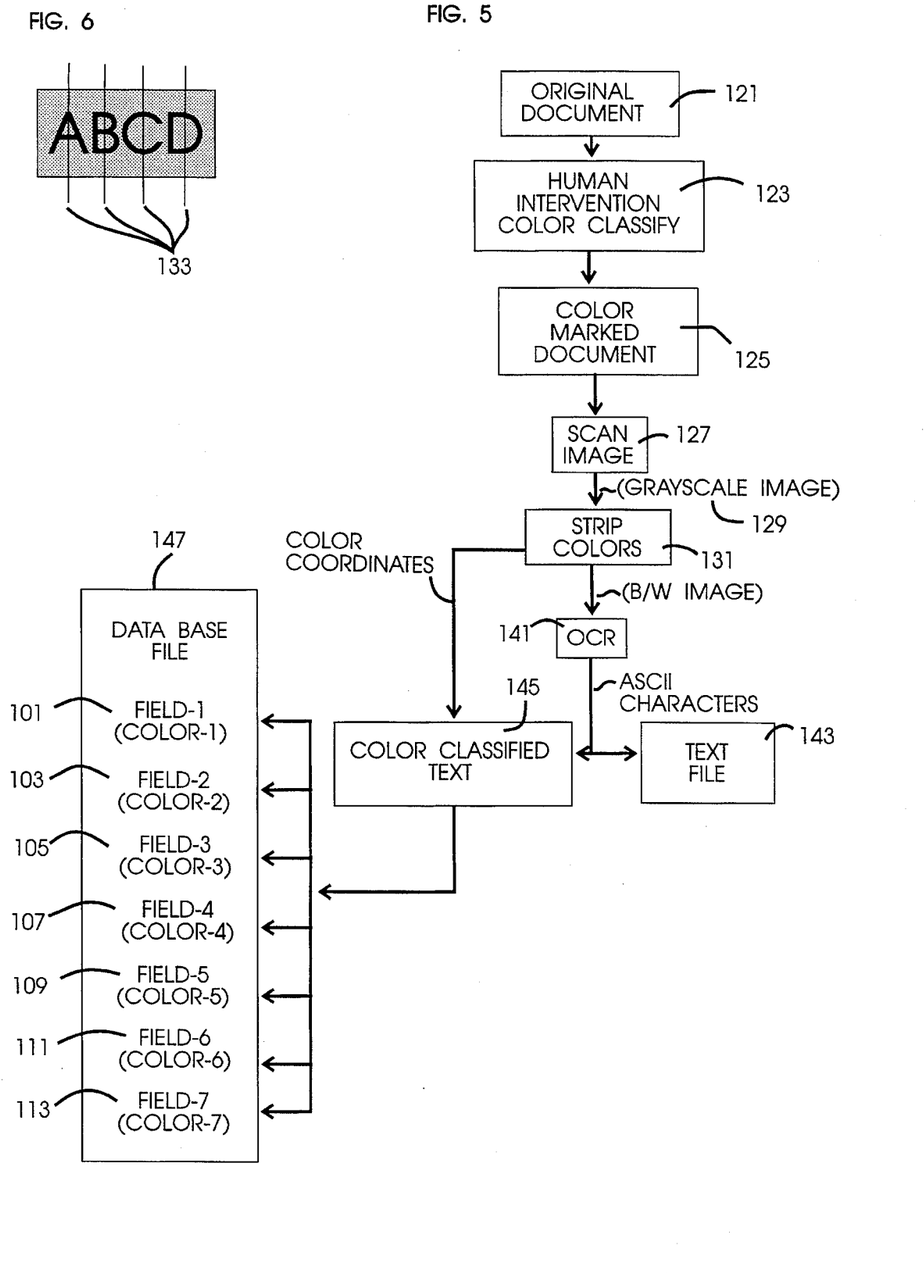
FIG. 5 is a more detailed flow chart illustrating the device and system of the present invention.
FIG. 6 illustrates coordinate references to typewritten characters within a shaded background.

In FIG. 5 a second example of the process flow is illustrated using the multiply color demarked letter 100 of FIG. 4. The original document is generated, at original document block 121 as a typed or hand written page with text in a color other than the color of the paper. Using color translucent pens commonly called highlight markers, the text in the sample document is classified at the human intervention color classify block 123, to determine the type of document present.

Once the process of classifying the document at block 123 is accomplished, the process of marking the document with colored pens begins at block 125. In the example of FIG. 4, seven color pens are used to mark the text. Once the document is highlighted, it is scanned, as represented by scan image block 127. A grayscale image signal 129 is produced, typically processed into a TIFF file and is made available to a strip colors block 131.

As the color determination is made at strip colors block 131, a further classification occurs. Referring to FIG. 6, a center line 133 of each black region of each of a series of sample characters ABCD is stored with a labels which correspond to grayshade levels. Each character may ideally occupy a 10 by 10 pixel area, although some pixel areas differ, as for example a 30 by 50 pixel area.

Figure 7:
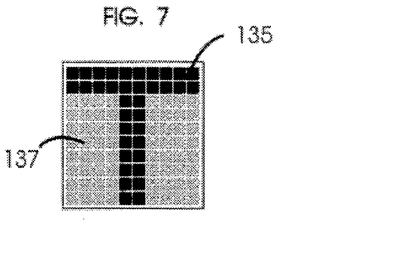
FIG. 7 is an illustration of a 10 by 10 pixel 4 bit grayscale image.

An enlarged view of a 10 by 10 pixel, 4 bit grayscale image is shown in FIG. 7, and illustrates the black letter "T" 135 and the medium grayshade region 137. The grayshade region 137 might be redefined to a white value (also known as a process of stripping the color) before it is processed by the optical character recognition routine in order to enhance the probability of correct recognition. This is done if the optical character reader is of a type which requires the background to be white. FIG. 5 represents an Intel format 10 by 10 pixel 4 bit grayscale TIFF image. The associated computer file listing for this image is shown for reference immediately before the claims, infra. This computer file listing is described by the Version 5.0 TIFF file specification, as jointly documented by Aldus Corporation, Seattle, Wash. and Hewlett Packard Company, Palo Alto, Calif. and Microsoft Corporation, Redmond, Wash.

It is understood that this file format is only one of the possible ways to store and process the data as it relates to this invention and several other industry standards including the PCX file format by Zsoft Corporation, Marietta, Ga. or the BMP file format by Microsoft Corporation, to mention a few, would work equally well. The data values are expressed in hexadecimal format with the image data specified as raster data.

Referring again to FIG. 5, an optical character recognition block 141 receives the color stripped signal from the strip colors block 131. The output of optical character recognition block 141 is the ASCII text is output from the optical character recognition routine. The ASCII text is provided to a text file block 143, similar to the case explained with reference to FIG. 3.

The ASCII text is also provided to a color classified text block 145 where the coordinates of the images are matched with the text and both are output to a data base fields block 145, where the data base fields are classified based upon their colored areas 101–113.

Figure 8:
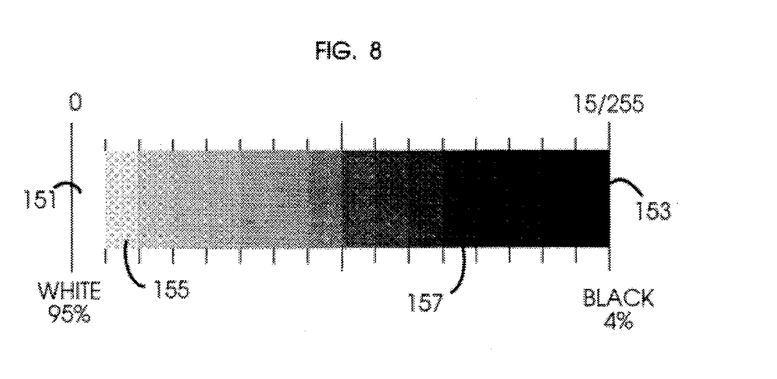
FIG. 8 is a linear graph of a grayscale chart with 16 intensity levels.

The details of the classification based upon percentage reflective gray scale is as follows. Referring to FIG. 8, reflective grayscale is illustrated in the form of a horizontal bar continuum. Since the scanning process outputs optical density data which is expressed as a measurement of light absorption as it relates to the reflection from the scanned document, compensation may be made to account for the light which is absorbed by the paper. This is particularly important in the case where pastel and off-color paper is used.

Paper commonly used in a copy machine, for example, has a reflection of about 80%. The reflection of very white paper may be as high as 95%. Beyond the 95% level, it is difficult for the human eye to discern any relative differences. The reflectance of the white paper is identified with the numeral 151. At the other end of the scale, the text regions also must be characterized. For this, the greatest density, which is the least reflective area, is not at the absolute value either, but somewhere around 4% reflection for black. The reflectance for black is identified with the numeral 153.

Other colors for page background or text can be used, and their density values determined by automatic program selection when these regions are at opposing positions in the spectrum FIG. 8. However, in the case where multi colored paper or text is on the page, these regions need to be manually identified so they can be differentiated from color classified regions.

Once the minimum 151 and maximum 153 optical density levels are determined, an acceptable end-range of grayscale is set, which has margins above and below selected limits, indicated by the numerals 155 and 157 representing the background and text values respectively. Values within the margin between the end range limits shall be further classifiable to grayscale values which can be detected and made eligible for data classification. The mid-range area is then available for segmenting into grayscale ranges which will be associated with labels which in turn relate to data base fields 101–113. These grayscale ranges shall allow margins above and below a target optical density to allow for error. For instance, color-1 which is associated with name portion 101 might be a medium light blue with an optical density of 60% and an acceptable reflective range from 55–65%. Color-2 which is associated with address portion 103 might have a density of 75% with a range from 65–85%, Color-3 which is associated with address portion 105 at 35% ranging from 30–40, and so on for the remaining colors. It is understood that the grayscale values used and available may not be evenly separated, and may be unevenly grouped.

Figure 9:
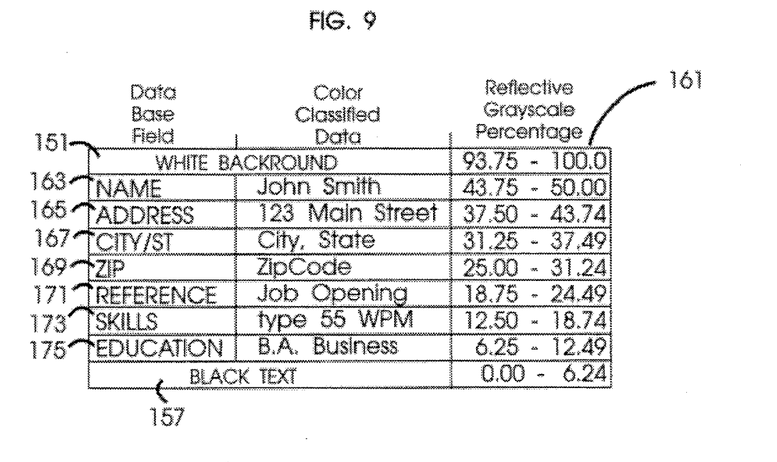
FIG. 9 is a look-up table for FIG. 4 which shows the relationship between the grayscale percentage range used to color classify data, a field of a data base file and the written text on the target document.

Referring to FIG. 9, a look up table 161 charting the data base fields, data and reflective grayscale is shown. This look-up table 161 is a "map" indicating how a particular reflective grayscale percentage is to be interpreted. Beginning at the left side of the chart, the fields white background 151, name 163, address 165, city/st 167, zip code 169, reference 171, skills 173, education 175, and black text 157 are listed. In the center column, information associated with each of the above fields, except white background 151 and black text 157 are listed. In the third column, the reflective grayscale percentages 161 associated with each field is listed.

This chart may be utilized in any of a number of ways. First, if the paper and colors to be marked on the forms are known, the chart may be known for a given type of illumination in a scanner to be used. The intensity and distribution of grayscale distribution from a highlighted sheet of paper is dependent upon the intensity and wavelength characteristic of the scanner's illumination source. If the grayscale percentages are not known initially, the computer could be programmed to characterize a test sheet for grayscale percentage, and use the test results to compute the median and range grayscale values and to generate the rightmost column shown in FIG. 9. This technique would be especially valuable where the colors of the markers would change over time due to drying, or if marker manufacturers were substituted, or if the paper brightness changed.

This invention has been discussed with regard to the specific and relative grayscale shadings from a given pixel. However, it is known that filters may be employed to manipulate the relative separation and magnitude of grayscale reflection detected from a multicolor source. For example, each pixel could be multiply scanned with a red filtered detector, a green filtered detector and a blue filtered detector, to name a few. The intensity peaks for a given shaded area would be shifted and perhaps attenuated differently for each filter employed. This technique could be utilized where a relatively large number of shading colors corresponding to a large number of fields were necessary to be employed.

In addition, the techniques for scanning discussed have emphasized the situation where a word on a line is to be highlighted, and where the remainder of the line is either unhighlighted or highlighted with a different color for insertion into a different field. In instances where, for example, whole paragraphs are to be designated to a single field, a vertical highlighted line may be used to the left of the text designated for that field. The software for recognizing the field need only be programmed to interpret the left justified, or even a right justified, vertical line.

A further alternative involves the use of a marker to box off large areas of text. Again, the software would have to be programmed to recognize an enclosure of a particular grayscale level and be enable to direct the text within the area into a particular data base.

Figure 10:
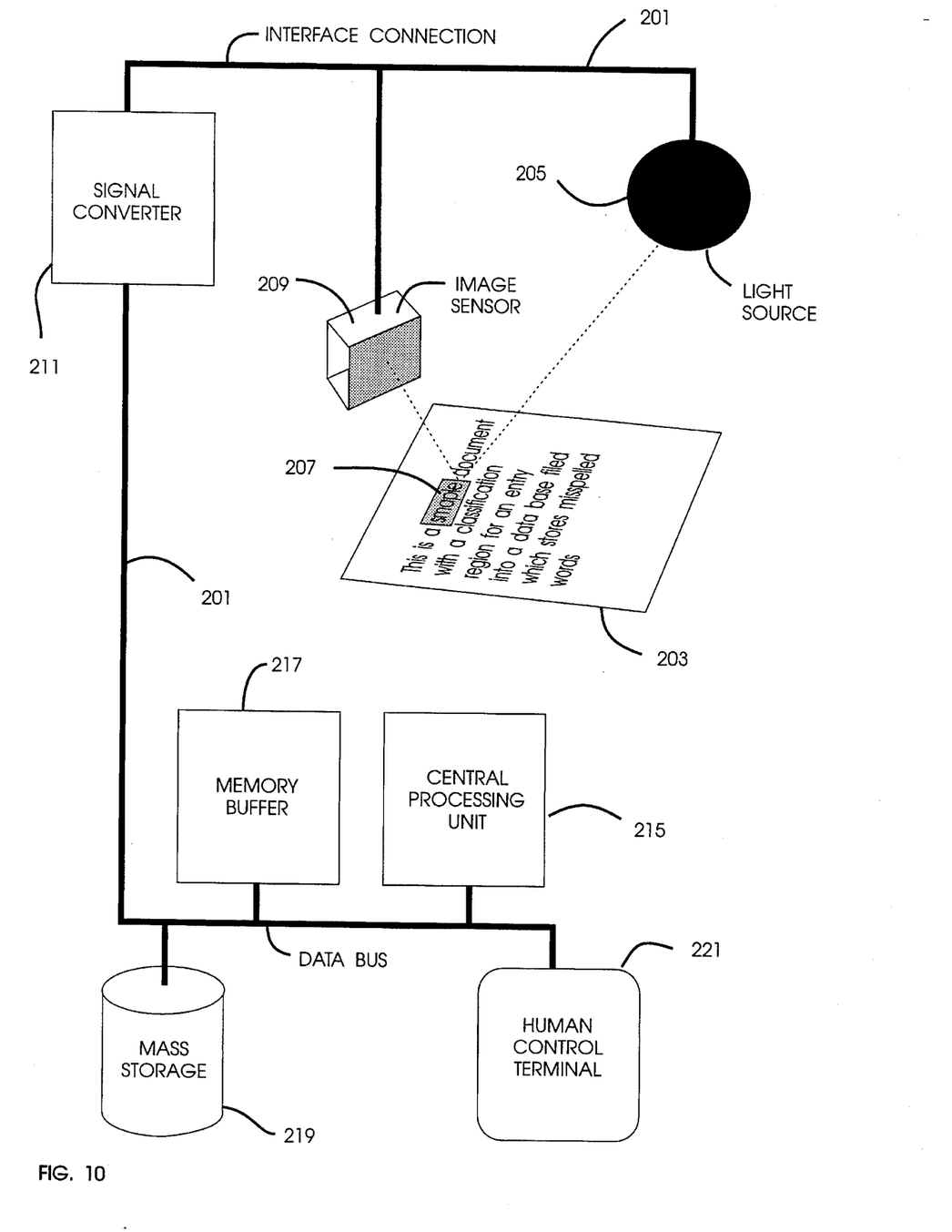
FIG. 10 shows an embodiment of the present invention.

Referring to FIG. 10, one possible configuration in which an apparatus may be formed to effect the process as described, supra, is shown. It is understood that the physical limits containing the devices needed to accomplish the method may differ in combination. For example, it is conceivable that a single device within a single housing may be sufficient to accomplish the inventive steps herein.

Referring to FIG. 10, an interface connection 201 connects the devices shown in FIG. 10. A target document 203 is illuminated by a light source 205. Light source 205 has the proper frequency output for reading properly shaded or colored regions on the document 203. Light source 205 is shown illuminating a color classified region 207 surrounding the misspelled word "smaple" on a document which reads "This is a smaple document with a classification region for an entry into a data base listed which stores misspelled words". The color classified region is used here to key a misspelled word so that the text of the document which is misspelled will be looked up and spelled correctly before the final text is stored in a file. This option is but one of many classification schemes which can utilize the inventive method herein.

An image sensor 209 detects light emanating from the surface of the document 203. Image sensor 209 and light source 205 may communicate with a signal converter 211, via the interface connection 201 in an analog fashon. Signal converter 211 converts the analog portion, if necessary, of the image sensor signal to digital format. A central processing unit 215 receives the image signal from the signal converter 211 and performs the necessary classifications, manipulations and makes storage decisions based upon its programming.

A memory buffer 217 may be provided to store a variety of programs for a variety of different classification schemes. Memory buffer 217 may be called upon to increase the flexibility of the overall system and provide look-up tables, etc. A mass storage unit 219 is used for storing the classified data bases once they have been appropriately image recognized and classified. A human control terminal 221 is provided to facilitate human control over the use of the system. This is useful when reprogramming the central processing unit 215, or creating files for the memory buffer 217.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

```
An Intel format 10 × 10 pixel 4 Bit Grayscale TIFF Image
Header
Offset      Value
000         49   49                  Note byte order is Intel format
002         2A   00                  Version #42; Note byte reversal
004         08   00   00   00        Pointer to first directory
Directory
008         10 00                    16 tags in this directory
            Offset Tag    Type          Length              Value/Offset
Tag 1       00A   FE   00   03   00   01   00   00   00   00   00   00   00   (NewSubfile type)
Tag 2       016   00   01   03   00   01   00   00   00   0A   00   00   00   (Image width 10 pixels)
Tag 3       022   01   01   03   00   01   00   00   00   0A   00   00   00   (Image length 10 pixels)
Tag 4       02E   02   01   03   00   01   00   00   00   04   00   00   00   (4 bits per sample)
Tag 5       03A   03   01   03   00   01   00   00   00   01   00   00   00   (No compression)
Tag 6       046   06   01   03   00   01   00   00   00   00   00   00   00   (Black is 15)
Tag 7       052   11   01   04   00   0A   00   00   00   FE   00   00   00   (offset to raster data)
Tag 8       05E   15   01   03   00   01   00   00   00   01   00   00   00   (1 sample per pixel)
Tag 9       06A   16   01   04   00   01   00   00   00   0A   00   00   00   (10 rows per strip)
Tag 10      076   17   01   04   00   01   00   00   00   32   00   00   00   (50 bytes per strip)
Tag 11      082   1A   01   05   00   01   00   00   00   CE   00   00   00   (Offset to X resolution)
Tag 12      08E   1B   01   05   00   01   00   00   00   D6   00   00   00   (Offset to Y resolution)
Tag 13      09A   22   01   03   00   01   00   00   00   03   00   00   00   (Gray Response
                                                                               Unit = thousandths)
Tag 14      0A6   23   01   03   00   10   00   00   00   DE   00   00   00   (Offset to Gray
                                                                               Response Curve)
Tag 15      0B2   28   01   03   00   01   00   00   00   02   00   00   00   (resolution units=inches)
Tag 16      0BE   41   01   03   00   01   00   00   00   01   00   0F   00   (highlight shadow values)
            0CA   00   00   00   00                                            (No more directories)
Extended tag information
0CE   2C   01   00   00   01   00   00   00           (300 dpi X resolution)
0D6   2C   01   00   00   01   00   00   00           (300 dpi Y resolution)
0DE   61   00   AB   00   d=      .097       .171     (gray response curve)
0E2   C9   00   EA   00           .201       .234
0E6   0D   01   33   01           .269       .307
0EA   5D   01   8B   01           .349       .395
0EE   BF   01   FA   01           .447       .506
0F2   3E   02   BF   02           .574       .655
0F6   F2   02   74   03           .754       .884
0FA   2D   04   F3   05           1.069      1.523
Raster data
0FE   FF   FF   FF   FF   FF   (10 black pixels)
103   FF   FF   FF   FF   FF   (10 black pixels)
108   77   77   FF   77   77   (4 medium gray, 2 black and 4 medium gray pixels)
10D   77   77   FF   77   77   (4 medium gray, 2 black and 4 medium gray pixels)
112   77   77   FF   77   77   (4 medium gray, 2 black and 4 medium gray pixels)
117   77   77   FF   77   77   (4 medium gray, 2 black and 4 medium gray pixels)
11C   77   77   FF   77   77   (4 medium gray, 2 black and 4 medium gray pixels)
121   77   77   FF   77   77   (4 medium gray, 2 black and 4 medium gray pixels)
126   77   77   FF   77   77   (4 medium gray, 2 black and 4 medium gray pixels)
12B   77   77   FF   77   77   (4 medium gray, 2 black and 4 medium gray pixels)
No strip offset pointers or byte counts needed
File is 304 (130H) bytes long.
```

What is claimed is:

1. A system for classifying each one of a plurality of different portions of highlighted text information into text data fields, each portion being highlighted with one of a plurality of colors, each color having a corresponding graylevel, comprising:

scanner means for scanning a printed form having at least a plurality of portions of the text information highlighted with a highlighting color, to produce an image of said form;

detector means connected to said scanner means for detecting, in said image, a respective hightlighting graylevel corresponding to each highlighting color;

associating means for associating each of said text data fields with one of a plurality of graylevel ranges;

classification means connected to said detector means and said associating means for classifying each highlighted portion of text into a text data field by determining into which one of the plurality of graylevel ranges the highlighting graylevel falls, and associating the highlighted portion of text with the text data field corresponding to the determined graylevel range.

2. The system of claim 1 wherein the classification means classifies each highlighted portion of text into a data field by look-up table.

3. The system of claim 1 further comprising calibration means for establishing the graylevel ranges associated with the highlighted portions by calibrating a highlighted sample.

4. The system of claim 1 further comprising storage means for storing each one of said at least a plurality of portions of the text information associated with its respective data field into a memory address associated with said data field.

5. A process for classifying each one of a plurality of different portions of highlighted text information into text data fields, each portion being highlighted with one of a plurality of colors, each color having a corresponding graylevel, comprising the steps of:

scanning a printed form having at least a plurality of portions of the text information highlighted with a highlighting color, to produce an image of said form;

detecting, in said image, a respective highlighting graylevel corresponding to each highlighting color;

associating each of said text data fields with one of a plurality of graylevel ranges;

classifying each highlighted portion of text into a text data field by determining into which one of the plurality of graylevel ranges the highlighting graylevel falls, and associating the highlighted portion of text with the text data field corresponding to the determined graylevel range.

6. The process of classifying each one of a plurality of different portions of highlighted text information into text data fields as recited in claim 5, and further comprising the step of storing each of said plurality of portions of the information associated with its data field into a memory address associated with said data field.

7. The process of classifying each one of a plurality of different portions of highlighted text information into text data fields as recited in claim 6, and further comprising the step of converting said text information into an ASCII representation of said information.

8. The process of classifying each one of a plurality of different portions of highlighted text information into text data fields as recited in claim 7, and further comprising the step of storing said ASCII representation of said information into its associated data field.

* * * * *